United States Patent
Cunningham et al.

(10) Patent No.: US 10,970,255 B1
(45) Date of Patent: *Apr. 6, 2021

(54) SYSTEM AND METHOD FOR SYNCHRONIZING DATA BETWEEN A CUSTOMER DATA MANAGEMENT SYSTEM AND A DATA WAREHOUSE

(71) Applicant: Veeva Systems Inc., Pleasanton, CA (US)

(72) Inventors: John Cunningham, Danville, CA (US); Naoya Yamasaki, Dublin, CA (US); George Zhu, San Mateo, CA (US)

(73) Assignee: Veeva Systems Inc., Pleasanton, CA (US)

( * ) Notice: Subject to any disclaimer, the term of this patent is extended or adjusted under 35 U.S.C. 154(b) by 52 days.

This patent is subject to a terminal disclaimer.

(21) Appl. No.: 16/051,363

(22) Filed: Jul. 31, 2018

Related U.S. Application Data

(63) Continuation-in-part of application No. 16/048,015, filed on Jul. 27, 2018.

(51) Int. Cl.
*G06F 16/00* (2019.01)
*G06F 16/178* (2019.01)
*G06Q 30/00* (2012.01)
*G06F 16/11* (2019.01)

(52) U.S. Cl.
CPC .......... *G06F 16/178* (2019.01); *G06F 16/116* (2019.01); *G06Q 30/01* (2013.01)

(58) Field of Classification Search
CPC .............................. G06F 16/178; G06F 16/116
See application file for complete search history.

(56) References Cited

U.S. PATENT DOCUMENTS

| | | | |
|---|---|---|---|
| 5,950,210 A * | 9/1999 | Nelson | G06F 16/219 |
| 6,324,544 B1 * | 11/2001 | Alam | G06F 16/10 |
| 2004/0073560 A1 * | 4/2004 | Edwards | G06F 16/1787 |
| 2006/0047731 A1 * | 3/2006 | Matsui | G06F 16/93 |
| 2006/0123010 A1 | 6/2006 | Landry et al. | |
| 2006/0248232 A1 * | 11/2006 | Chasman | G06F 16/273 709/248 |
| 2007/0130541 A1 * | 6/2007 | Louch | G06F 3/04817 715/804 |
| 2010/0145910 A1 * | 6/2010 | Zhao | G06F 11/1658 707/620 |
| 2011/0077958 A1 * | 3/2011 | Breitenstein | G06Q 10/10 705/2 |
| 2012/0150801 A1 * | 6/2012 | Mantri | G06F 16/11 707/626 |
| 2012/0310875 A1 * | 12/2012 | Prahlad | G06F 16/2465 707/602 |

(Continued)

*Primary Examiner* — Alexander Khong

(57) ABSTRACT

Systems and methods for synchronizing data between a customer data management system and a data warehouse system. A data warehouse server may constantly monitor a dynamic metadata flow from the customer data management system, compare it with the metadata in the data storage device, and dynamically update the metadata in the data storage device. The data warehouse server may track activities over time and accumulate a long running history, which may include multiple versions of accounts in the customer data management system, e.g., the account as of today, the account as of yesterday, and another version that was the account two weeks ago.

19 Claims, 7 Drawing Sheets

(56) References Cited

U.S. PATENT DOCUMENTS

2016/0085631 A1* 3/2016 Madiraju Varadaraju ...................
 G06F 11/1451
 707/653
2016/0085769 A1* 3/2016 Penangwala .......... G06F 16/178
 707/610
2017/0149885 A1* 5/2017 Kaplan ................. H04L 67/303

* cited by examiner

US 10,970,255 B1

SYSTEM AND METHOD FOR SYNCHRONIZING DATA BETWEEN A CUSTOMER DATA MANAGEMENT SYSTEM AND A DATA WAREHOUSE

CROSS-REFERENCE TO RELATED APPLICATIONS

The present application is a continuation-in-part of U.S. nonprovisional patent application Ser. No. 16/048,015, filed on Jul. 27, 2018, entitled System and Method for Synchronizing Data Between a Customer Data Management System and a Data Warehouse, which is hereby incorporated by reference herein for all purposes.

BACKGROUND

The subject technology relates generally to customer data management, and more particularly to synchronizing data between a customer data management system and a data warehouse.

In the pharmaceutical sales industry, sales representatives are required to use call reports to record meetings and other interactions with doctors, including face-to-face meetings and discussions via phone or the Internet, and the call reports need to include the doctors' professional information, the medical products discussed, the materials shown to the doctors, the samples left, etc. Non-compliant call reports may expose company employers (e.g., a pharmaceutical company) to regulatory penalties or other legal liabilities. Call report information may be managed by a customer relationship management ("CRM") system. Call report information may also be stored in a data warehouse. It is desirable to provide a method for synchronizing data between the CRM system and the data warehouse.

SUMMARY

The disclosed subject matter relates to a method for synchronizing data between a CRM system and a data warehouse system. The method comprises: creating a first list for a first item and a second item in the customer data management system that the data warehouse server automatically monitors; creating a second list for a third item and a fourth item in the customer data management system that the data warehouse server does not need to monitor; creating a synchronization table which comprises the first list and the second list; reading files for the first and second items on the first list from the customer data management system; extracting metadata from the files for the first item and creating a correspond object for the first item in a metadata repository, and extracting metadata from the files for the second item and creating a corresponding object for the second item in the metadata repository, wherein each corresponding object comprises a plurality of columns, and comprises information about ID and data type of the first and second items, and wherein the corresponding object for the first item in the metadata repository and the first item have a different number of columns. The method further comprises: excluding the third and fourth items.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

Figure 1:
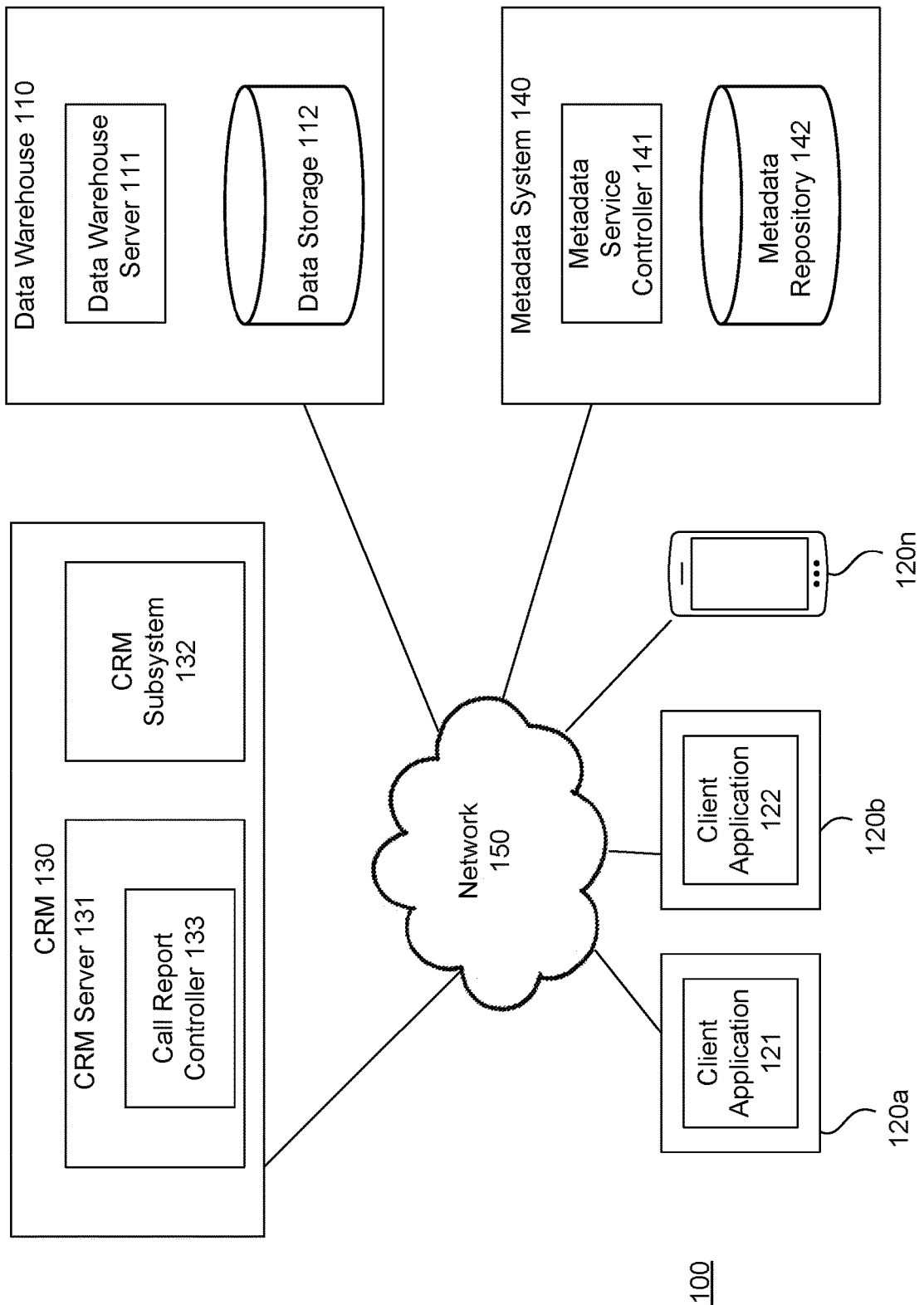
FIG. 1 illustrates an example high level block diagram of a customer relationship management architecture wherein the present invention may be implemented.

FIG. 1 illustrates an example high level block diagram of a customer relationship management architecture 100 wherein the present invention may be implemented. As shown, the architecture 100 may include a data warehouse 110, a plurality of user computing devices 120a, 120b, ... 120n, a CRM 130, and a metadata service ("MBS") system 140 coupled to each other via a network 150. The CRM 130 may include a customer relationship management server 131, and a customer relationship management subsystem 132. The customer relationship management server 131 may further include a call report controller 133. The network 150 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 120a-120n may be any machine or system that is used by a user to access the CRM 130 via the network 150, and may be any commercially available computing devices including laptop computers, desktop computers, mobile phones, smart phones, tablet computers, netbooks, and personal digital assistants (PDAs). A CRM client application 121 may run from a user computing device, e.g., 120a, and access the CRM 130 via the network 150 to create a call report. A second CRM client application 122 may run from a user computing device, e.g., 120b, to access data in the CRM 130 and data warehouse 110. User computing devices 120a-120n are illustrated in more detail in FIG. 3.

The data warehouse 110 may store data that a user (e.g., a sales representative) may access via a client application (e.g., 121) in a user computing device (e.g., 120a), and may be any commercially available storage devices. In one example, the data warehouse 110 may have a data warehouse server 111 and a data storage device 112. The data warehouse server 111 may monitor activities in the CRM system, which may be, e.g., adding new records, adding new calls, adding new attributes. The data warehouse server 111 may detect the changes, dynamically change the corresponding object in the data storage device 112 to reflect the changes, and change the metadata to reflect the changes. The data storage device 112 may store a running history of data stored in the CRM 130, including different versions of the CRM data over time.

In an embodiment, the data warehouse 110 is a cloud-based or distributed network based system for storing data of customers of the CRM 130, including not only the latest version of the data, but also the running history of data stored in the CRM 130. Information about activities happened in the CRM 130 may be collected and transformed into a data format for the data warehouse 110 and stored in the data warehouse 110. Consequently, the data warehouse 110 may store data about activities happened in the CRM 130, e.g., the number of calls going on, the number of events going on, and attendees of an event. Data in the data warehouse 130 may be organized into a manageable, and presentable way.

Customers may customize their data in the CRM 130. The customization may be, e.g., adding a new object or a new attribute to an existing CRM object. The system 100 of the present invention may automatically detect the customizations, and dynamically change the reporting model based on data from the CRM 130.

If a customer adds a new object (e.g., an object for vacations) to the CRM 130, the system 100 of the present invention may automatically detect it, and dynamically insert it into the date warehouse 110. The system 100 of the present invention may keep tracking changes related to this object.

When the customization is adding an attribute to an existing object in the CRM 130, the present invention may automatically detect associated metadata changes, dynamically add the attribute to a corresponding object in the data warehouse 110, store it in the data warehouse 110, and start to keep a running history of this attribute, including when it is added to the CRM object.

In one example, a user is looking at an account object via the CRM 130, and may decide to add an extra attribute to it. For example, a color attribute. The data warehouse server 111 may automatically detect that change, dynamically change the schema of data in the data warehouse 110 to reflect that change, and merge the color data with data in the data storage device 112. When the user looks at that account object later, he/she may see the old version and new version.

In one implementation, the data warehouse server 111 may first focus on the schemas, and constantly detect for changes and update the data, e.g., additional accounts, and account attributes. The data warehouse server 111 may track activities over time and accumulate a long running history, which may include multiple versions of accounts, e.g., the account as of today, the account as of yesterday, and another version that was the account two weeks ago.

Even if the customer deletes an object or attribute in the CRM 130, the long running history of this object or attribute, including when it is created, when it is deleted, changes and other related activities, and all different versions of the CRM data over time, may be kept in the data warehouse 110. Thus, the customers may access the data warehouse to see the old activities.

In one implementation, the data warehouse server 111 may detect the change in the CRM 130, and extract the data to the new data model of the data storage device 112 automatically. When a user accesses the data, he/she may access the converted version in the data warehouse.

In one implementation, the data warehouse server 111 may constantly monitor the dynamic metadata flow from the CRM 130, compare it with the metadata of data in the data storage device 112, and dynamically update the metadata of data in the data storage device 112.

In one implementation, the system 100 may focus on what is actually reported, including the data users are seeing.

In one implementation, the data warehouse 110 may be a data collection engine, organizing and structuring the data to be reportable. Customers may read data from the data warehouse 110 through the CRM 130 or a third party application when running management reports.

In one implementation, the data warehouse 110 may keep monitoring metadata of objects in the CRM 130. If any object in the CRM 130 gets a new row added to it, or a new record added to it, the data warehouse server 111 may automatically pick up the changes and add them to the copy inside the data storage device 112.

The data warehouse server 110 may regularly check standard tables in the CRM 130, and extract data from them. In one implementation, incremental extractions may be carried out. If a customer changes schema of any of these tables, adding or deleting attributes, or changing a data type of an attribute, the data warehouse server 111 may pick up that change, and automatically insert it to the data storage device 112.

In one implementation, if a customer adds another table, another object, the data warehouse server 111 may automatically detect that, and pull that over to the data storage device 112, e.g., by dynamically adapting their formats to those in the data warehouse 110, and adding the new table or new object to the data warehouse 110. If the customer adds attributes or delete attributes, or change data type of attributes, the data warehouse server 111 may detect the change, compare the metadata of the updated object with the object in the data warehouse 110, and continue to change the reporting schema to match the changes. The data warehouse server 111 may keep track of version history of all changes happened in the data warehouse 110 and timestamp it.

In one implementation, each customer may have a separate data warehouse 110.

The customer relationship management server 131 is typically a remote computer system accessible over a remote or local network, such as the network 150, and may provide access to the customer relationship management subsystem 132. The customer relationship management server 131 could be any commercially available computing devices. A client application (e.g., 121) process may be active on one or more user computing devices 120a-120n. The corresponding server process may be active on the customer relationship management server 131. The client application process and the corresponding server process may communicate with each other over the network 150, thus providing distributed functionality and allowing multiple client applications to take advantage of the information-gathering capabilities of the CRM 130.

In one implementation, the customer relationship management server 131 may include a call report controller 133 which may control the process for generating a call report.

Although the customer relationship management server 131 and the call report controller 133 are shown in one device, it should be understood that they may be implemented in multiple servers.

In one implementation, the customer relationship management subsystem 132 contains customer account information that may be available to sales representatives. The customer account information may be HCP professional information, including their license, area of practice and contact information. In addition to storing HCP professional information, the customer relationship management subsystem 132 may also be capable of storing configurations regarding specific preferences, regulatory limitations and requirements, and other fields that will facilitate communications, in general or on a by-recipient basis.

In one implementation, the customer relationship management subsystem 132 is capable of communicating with multiple sources through the customer relationship management server 131 or through other channels to maintain a current and accurate collection of information regarding customer accounts, which may include group accounts and individual accounts. The interface with the multiple sources can be, for example, through an Application Programming Interface or API, as the API interface will allow compatibility with a flexible array of third-party provider servers. The information being updated may include, but is not limited to, licensing information, area of practice, and location of the various customer accounts. In this manner, the customer relationship management subsystem 132 pulls the approved version of what represents an account, which may be a hospital or physician, which then pulls from multiple networks to ensure that the information regarding an account is up-to-date.

In one implementation, the customer relationship management subsystem 132 may be operated by a third party.

In one implementation, the CRM 130 may be a multi-tenant system where various elements of hardware and software may be shared by one or more customers. For instance, a server may simultaneously process requests from a plurality of customers. In a multi-tenant system, a user is typically associated with a particular customer. In one example, a user could be an employee of one of a number of pharmaceutical companies which are tenants, or customers, of the CRM 130.

In one embodiment, the CRM 130 and the data warehouse 110 may run on a cloud computing platform. Users can access information and content on the cloud independently by using a virtual machine image, or purchasing access to a service maintained by a cloud database provider. The customer relationship management subsystem 132 may be a cloud-based customer database that provides a central access to store and distribute consistent data across customer companies as well as their possible third-party partners and agencies that are used to keep this data updated. This system can provide standard data formats and provide an easy and automated way for customers to have access to coordinated and frequently updated CRM data.

In one embodiment, the CRM 130 may be provided as Software as a Service ("SaaS") to allow users to access it with a thin client.

The metadata service system 140 may include a metadata service controller 141 and a metadata repository 142. Metadata in the CRM 130 may be extracted from the files by the metadata service controller 114, and then stored in the metadata repository 142. In one implementation, the metadata repository 142 is outside of the data warehouse 110. In one implementation, the metadata repository 142 is a MySQL™ database.

Figure 2:
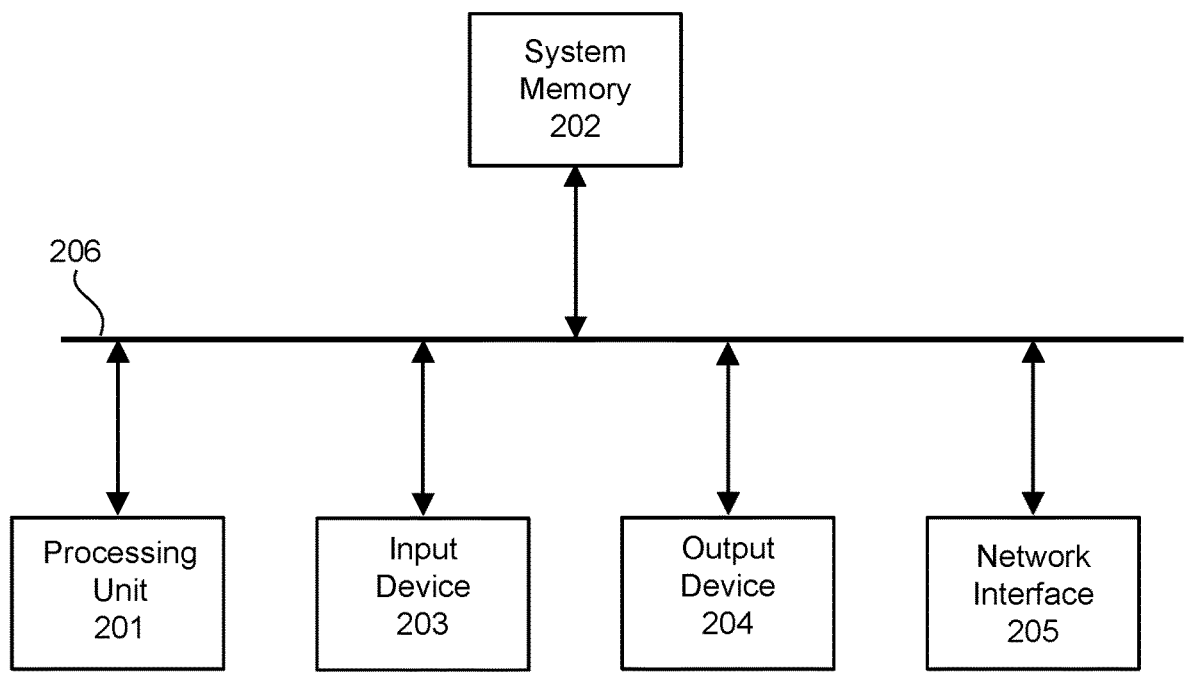
FIG. 2 illustrates an example block diagram of a computing device.

FIG. 2 illustrates an example block diagram of a computing device 200 which can be used as the user computing devices 120a-120n, the customer management relationship server 131 and the data warehouse server 111 in FIG. 1. The computing device 200 is only one example of a suitable computing environment and is not intended to suggest any limitation as to scope of use or functionality. The computing device 200 may include a processing unit 201, a system memory 202, an input device 203, an output device 204, a network interface 205 and a system bus 206 that couples these components to each other.

The processing unit 201 may be configured to execute computer instructions that are stored in a computer-readable medium, for example, the system memory 202. The processing unit 201 may be a central processing unit (CPU).

The system memory 202 typically includes a variety of computer readable media which may be any available media accessible by the processing unit 201. For instance, the system memory 202 may include computer storage media in the form of volatile and/or nonvolatile memory such as read only memory (ROM) and/or random access memory (RAM). By way of example, but not limitation, the system memory 202 may store instructions and data, e.g., an operating system, program modules, various application programs, and program data.

A user can enter commands and information to the computing device 200 through the input device 203. The input device 203 may be, e.g., a keyboard, a touchscreen input device, a touch pad, a mouse, a microphone, and/or a pen.

The computing device 200 may provide its output via the output device 204 which may be, e.g., a monitor or other type of display device, a speaker, or a printer.

The computing device 200, through the network interface 205, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 150) and/or buses. The network interface 205 may be configured to allow the computing device 200 to transmit and receive data in a network, for example, the network 150. The network interface 205 may include one or more network interface cards (NICs).

Figure 3:
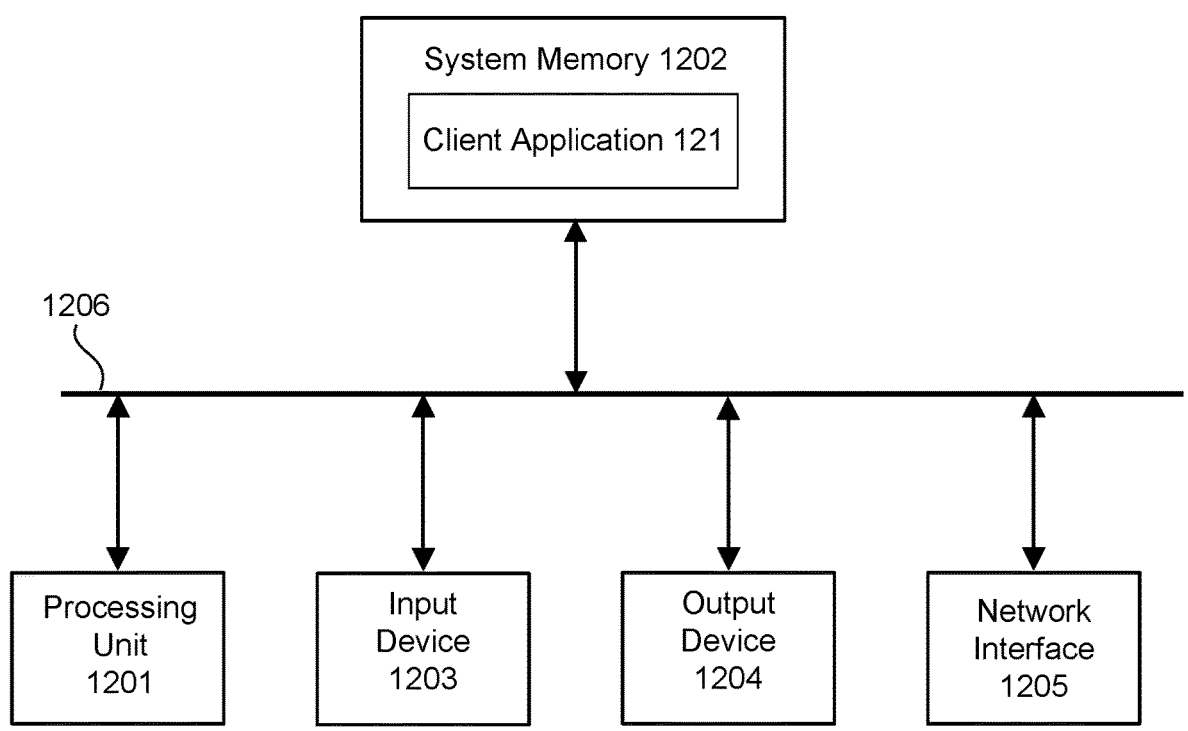
FIG. 3 illustrates an example high level block diagram of a user computing device.

FIG. 3 illustrates an example high level block diagram of a user computing device (e.g., 120a) wherein the present invention may be implemented. The user computing device 120a may be implemented by the computing device 200 described above, and may have a processing unit 1201, a system memory 1202, an input device 1203, an output device 1204, and a network interface 1205, coupled to each other via a system bus 1206. The system memory 1202 may store the CRM client application 121 or 122.

Figure 4:
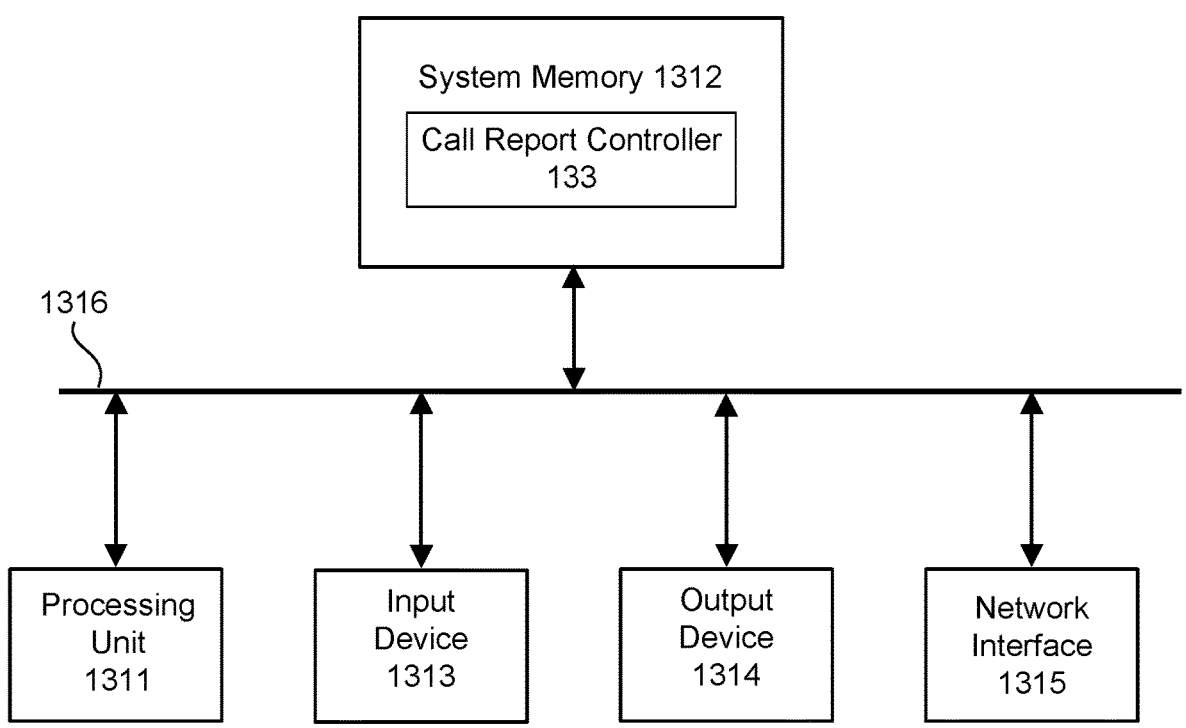
FIG. 4 illustrates an example high level block diagram of the customer relationship management server according to one embodiment of the present invention.

FIG. 4 illustrates an example high level block diagram of the customer relationship management server 131 according to one embodiment of the present invention. The customer relationship management server 131 may be implemented by the computing device 200, and may have a processing unit 1311, a system memory 1312, an input device 1313, an output device 1314, and a network interface 1315, coupled to each other via a system bus 1316. The system memory 1312 may store the call report controller 133.

Figure 5:
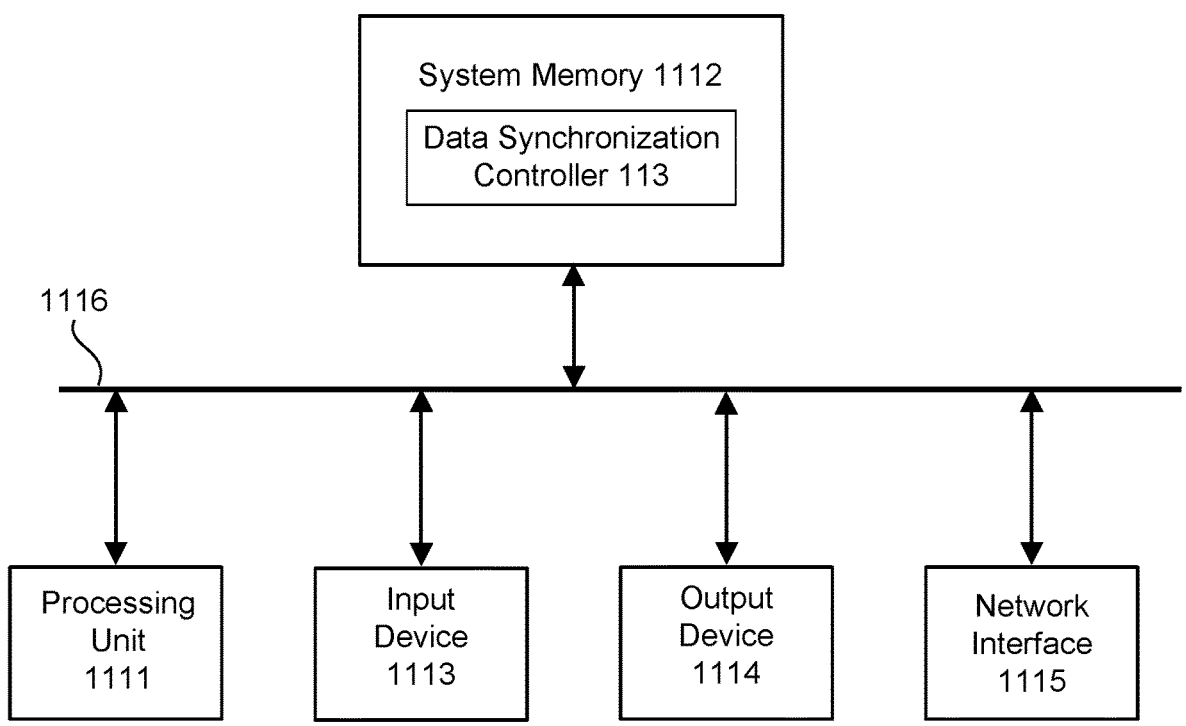
FIG. 5 illustrates an example high level block diagram of the data warehouse server according to one embodiment of the present invention.

FIG. 5 illustrates an example high level block diagram of the data warehouse server 111 according to one embodiment of the present invention. The data warehouse server may be implemented by the computing device 200, and may have a processing unit 1111, a system memory 1112, an input device 1113, an output device 1114, and a network interface 1115, coupled to each other via a system bus 1116. The system memory 1112 may store a data synchronization controller 113.

Figure 6A:
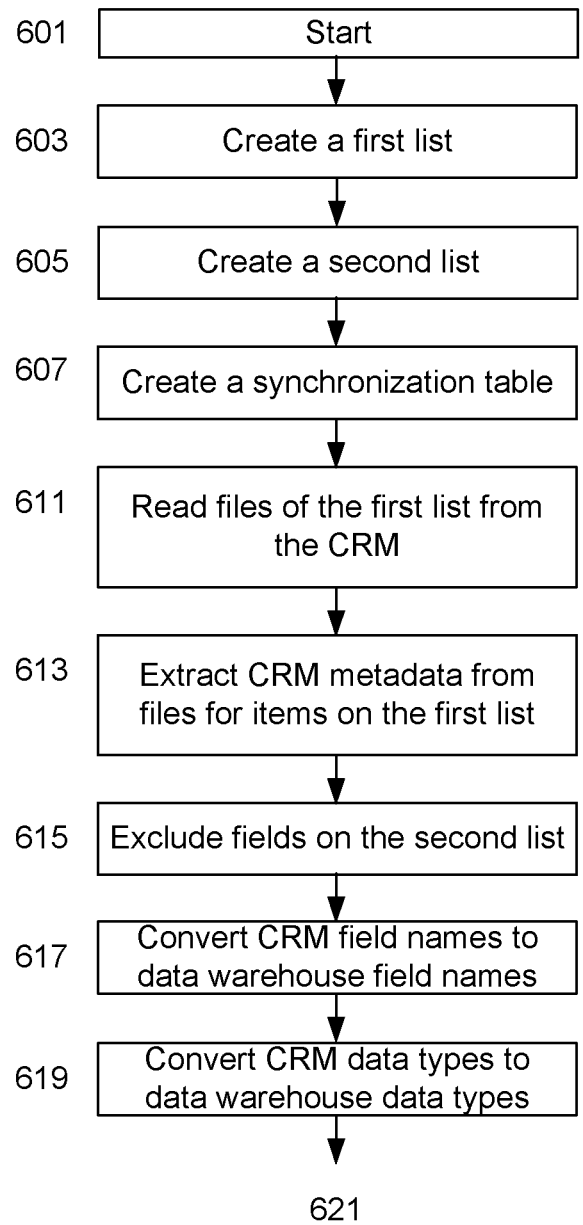
FIGS. 6A and 6B illustrate an example flowchart of a method for synchronizing data between the CRM and the data warehouse according to one embodiment of the present invention.
Figure 6B:
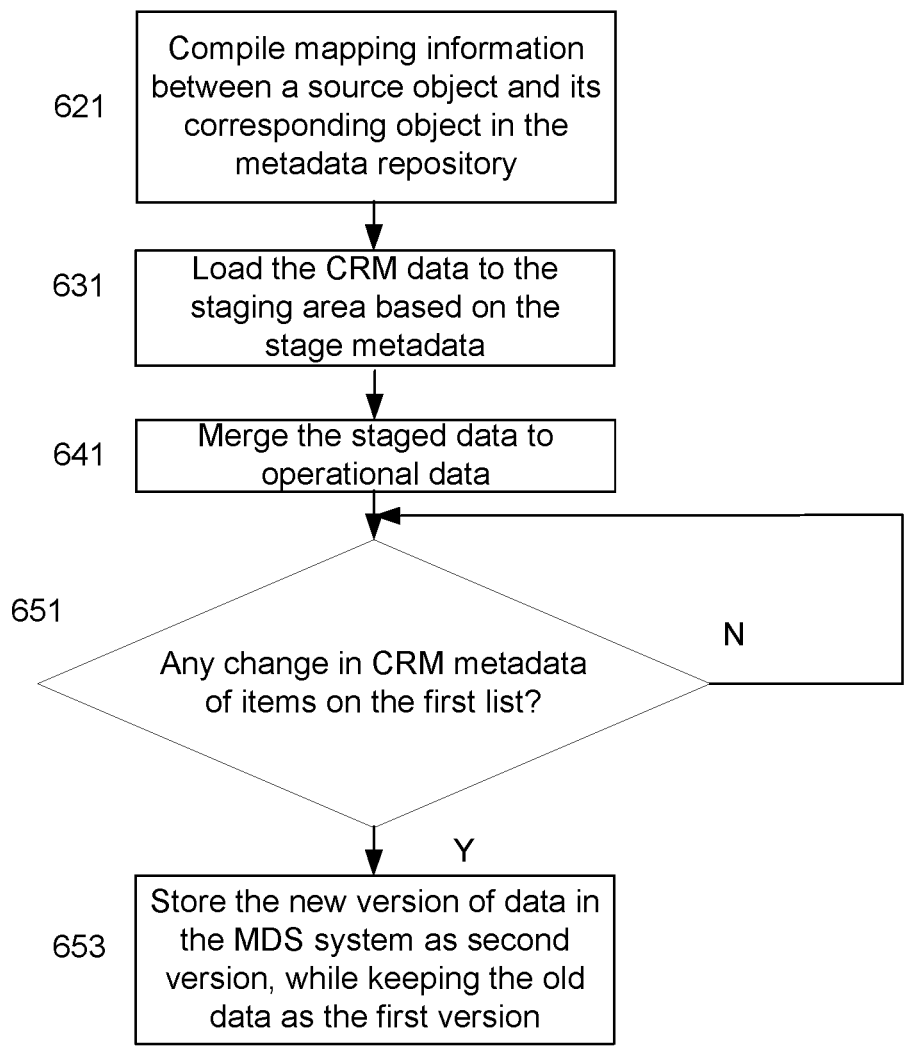

FIG. 6 illustrates an example flowchart of a method for synchronizing data between the CRM 130 and the data warehouse 110 according to one embodiment of the present invention. The process may start at 601.

At 603, a first list may be created for documents, objects and/or attributes in the CRM 130 that the data warehouse server 111 needs to automatically monitor, detect the changes, and synchronize the changes to the data warehouse 110.

At 605, a second list may be created for documents, objects, and/or attributes that the data warehouse server 111 needs to ignore when monitoring changes in the CRM 130.

At 607, a synchronization table may be created. The synchronization table may include the first list and the second list. An example of the synchronization table is shown below:

name: Patient_c

Source: CRM where_Clause:

black_List_columns:

name: LastModifiedBy name: CreatedBy name: Type_c

Then metadata data description language ("DDL") may be generated for the first list. Specifically, at 611, files for items on the first list may be read from the CRM 130.

At 613, metadata in the CRM 130 may be extracted from the files for items on the first list, e.g., by the metadata service controller 141, which collects metadata and stores the metadata in the metadata repository 142. In one implementation, the metadata repository 142 is outside of the data warehouse 110. In one implementation, the metadata is stored in a MySQL™ database. In one example, the first item on the first list may be, e.g., client_c in the CRM 130. The metadata service controller 141 may read metadata of client_c from the object of client_c from the CRM 130, and extract the metadata to create a corresponding object in the metadata repository 142 for items on the first list. The corresponding object may have col. 1, col. 2, col. 3, . . . and col. n. The metadata repository 142 may become the reference data and be checked for updates to the CRM 130. The metadata may indicate what to call, and what the object types are. From the metadata repository 142, the metadata service controller 141 may automatically find data definition language ("DDL").

In one implementation, the CRM metadata may be temporarily stored as stage data in a staging area in the data warehouse 110, and the CRM metadata change may be inherited to the stage schema.

At 615, fields on the second list may be excluded.

At 617, a field name conversion logic may be applied to convert field names from the CRM 130 to corresponding field names of the data warehouse 110. In one example, a CRM field name "Custom_Object_c.Id" may be converted to "crm_<custom_object>_id_s".

At 619, a data type conversion logic may be applied to convert data types from the CRM 130 to corresponding data types of the data warehouse 110. Some examples of the data type conversion are shown below:

TABLE 1

| CRM Data Type | Datawarehouse Data Type |
| --- | --- |
| Checkbox | Boolean |
| Currency | Decimal |
| Date | Date |
| DateTime | Timestamp |

As shown, the CRM data type DateTime may be converted to the data warehouse data type "timestamp".

At 621, the metadata service controller 141 may categorize and compile mapping information between the source object (e.g., client_c in the CRM system) and the its corresponding data warehouse object. The mapping is managed in metadata. The mapping information may include name of the source object (e.g., client_c in the CRM system), name of the corresponding data warehouse object (e.g., client_STC), ID of the source object, columns of the source object (e.g., col. 1, col. 2, col. 3, . . . col. n), and their corresponding columns in the corresponding data warehouse object (e.g., col. 1, col. 2, col. 3, . . . col. n). With the mapping information, the MDS system 140 may get the corresponding object's source in the CRM 130.

At 631, the CRM data may be loaded based on the metadata in the metadata repository.

In one implementation, a temporary table may be used for collecting and staging the data. A table is a definition of all the columns in characters of one given table, and mapping is a definition of relationship between two different tables, e.g., a from table and a to table. Objects read from the CRM 130 may be assigned new IDs based on the mapping definition, e.g., the from table, and the to table.

In one implementation, the CRM data, e.g., one day worth of data, may be temporarily staged in a staging area on the data warehouse 110 based on the corresponding metadata extracted at 613. In one implementation, the staged data may include the new data that has been extracted since the last time the data is loaded.

At 641, the staged data may be moved to an operational data store ("ODS") and merged with the operational data there, e.g., with the ODS metadata. In one implementation, the data synchronization controller 113 may use metadata mapping to move data from the CRM 130 to the staging area on the data warehouse 110. The staged data may be merged into the resulting data warehouse object using another metadata mapping definition. The ODS may be used for long running collection of data for each object, even when the shape is shifted over time.

In one implementation, corresponding objects may be created in the MDS system 140 for objects in the CRM 130. The metadata service controller 141 may detect and track changes in the CRM 130, and merge the changes into the ODS with data that is already in the ODS table. Over time, a combination of various versions of the CRM data, including the deleted data, the old versions, and the latest version, may be obtained and stored in the ODS.

At 651, the metadata service controller 141 may check the metadata of items on the first list in the CRM 130 periodically, e.g., once a night, and compare metadata in the CRM 130 of items on the first list with that in the metadata repository 142.

If there are changes, e.g., client_c is updated with a new column, the MDS system 140 may store the second version of client_c in MDS at 653, while still keeping the first version of client_c in the MDS system 140.

At 655, the data warehouse version metadata may be updated accordingly.

When there is a new column, object or a new record, it may be stored in the MDS system 140. Even when an existing column, object or record is deleted from the CRM 130, it may still be kept in the MDS system 140.

Wherever the users do in the CRM, the MDS system 140 may keep a record. In one example, a user may add a new column A to an object, and load data into A. The MDS system 140 may create a corresponding object inside the data warehouse 110, with one day worth of data in it. The next day the user wants to change the name A to "address". The MDS system 140 may detect that, find out A no longer exists, and stop asking for that when running inquiries back to the CRM 130. Instead, the MDS system 140 may ask for the new object Address. Thus, the MDS system 140 may get two day worth of data in Address, with one day worth of data in the column Address, sitting next to one day worth of data in column A. Over time, the MDS system 140 may keep on collecting data from the CRM 130, build the footprint whatever user have done, and get a constant history of user activities happened in the CRM 130.

In one implementation, the MDS system 140 may create a table comparing the second version of client_c with the first version of client_c. The MDS system 140 may determine the time of the change, and include the time stamp in the list.

In one implementation, the corresponding metadata object in the metadata repository 142 created at 613 may be customized dynamically to include more data columns or fewer data columns than the CRM metadata. In one example, a data column for Start Date and a data column for End Date may be added to the corresponding metadata object to define effective dates of the data. The Start Date may indicate when the data starts to be effective. The Start Date may be determined from the CRM metadata when the CRM metadata is extracted from files for items on the first list at 613. The Start Date may be the date that the data was stored to the CRM 130 and may be added to the metadata repository 142. The End date may indicate when the data stops to be effective. In one example, when the CRM data is updated from version 1 to version 2, the date of update may be added to the metadata repository 142 as the End Date of version 1, and Start Date of version 2. Version 1 has an End Date and is no longer invalid. Version 2 may have a null End Date, indicating that the data is valid. In one example, when data is deleted from the CRM 130, the date it is deleted may be added to the metadata repository 142 as the End Date of the deleted data.

When a user runs an inquiry, e.g., the data on May 1, the data warehouse server 110 may look inside the history records, and return data at that point. The effective date may help to keep track of all historical changes.

In one implementation, the data pattern of the corresponding object in the metadata repository 142 (e.g., whether to include the Start Date or End Date) may be defined by an algorithm. The algorithm may be encoded to define how to load the data into the data patterns. In one implementation, a pattern SQL may be used to define the data pattern.

In one example, the user may be interested in the latest version of the data only, and does not want to use effective dates to track changes over time. When the data is loaded to the staging area at 631, or merged with the operational data, the Start Data and End Date may be ignored.

In one implementation, a plurality of data patterns may be provided for users to choose from.

Although the CRM System is used as an example of the customer data management system, it should be appreciated that the customer data management system could include other types of systems, e.g., a customer content management system.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs. Examples of computer programs or computer code include machine code, for example is produced by a compiler, and files including higher-level code that are executed by a computer, an electronic component, or a microprocessor using an interpreter.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more.

What is claimed is:

1. A computer-implemented method for synchronizing data between a customer data management system and a data warehouse, wherein the data warehouse comprises a data warehouse server and a data storage device and stores data from the customer data management system, the method comprising:
   creating a first list for a first item and a second item in the customer data management system that the data warehouse server automatically monitors;
   creating a second list for a third item and a fourth item in the customer data management system that the data warehouse server does not need to monitor;
   creating a synchronization table which comprises the first list and the second list;
   reading files for the first and second items on the first list from the customer data management system;
   extracting metadata from the files for the first item and creating a corresponding object for the first item in a metadata repository, and extracting metadata from the files for the second item and creating a corresponding object for the second item in the metadata repository, wherein each corresponding object comprises a plurality of columns, and comprises information about ID and data type of the first and second items, wherein the corresponding object for the first item in the metadata repository and the first item have a different number of columns, and wherein the metadata from the files for the first item and the corresponding object for the first item comprise a first type of data in the first item, and the metadata from the files for the second item and the corresponding object for the second item comprise a second type of data in the second item, and wherein the first type of data and second type of data are different;
   converting the data types in the customer data management system to corresponding data types in the data warehouse system with a data type conversion logic; and
   excluding the third and fourth items.

2. The method of claim 1, wherein the corresponding object for the first item in the metadata repository has a first additional column.

3. The method of claim 2, wherein the first additional column is a start date that the data in the customer data management system starts to be effective.

4. The method of claim 3, wherein the start date may be determined from the files for the first item.

5. The method of claim 2, wherein the corresponding object for the first item in the metadata repository has a second additional column.

6. The method of claim 5, wherein the second additional column is an end date that the data in the customer data management system stops to be effective.

7. The method of claim 6, wherein the end date is the date on which the data is updated.

8. The method of claim 6, wherein the end date is the date on which the data is deleted from the customer data management system.

9. The method of claim 6, further comprising: setting the end date as null when the data is valid.

10. The method of claim 1, wherein the first item is a document in the customer data management system.

11. The method of claim 1, further comprising: converting field names in the customer data management system to corresponding field names in the data warehouse with a field name conversion logic.

12. The method of claim 1, further comprising: compiling mapping information between metadata of a source object in the customer data management system and metadata of its corresponding object in a metadata repository.

13. The method of claim 12, further comprising: loading the data from the customer data management system to the data warehouse based on metadata of the corresponding object in the metadata repository.

14. The method of claim 13, further comprising: using a temporary table to stage the data from the customer data management system with the metadata of corresponding object.

15. The method of claim 14, further comprising: moving the staged data to an operational data store and merging the staged data with the operational data.

16. The method of claim 15, further comprising: comparing metadata of the first item on the first list in the customer data management system with metadata of the corresponding item in the metadata repository.

17. The method of claim 16, further comprising: when the first item in the customer data management system is updated from a first version to second version, storing the second version of the first item in the data warehouse together with the first version of the first item.

18. The method of claim 1, wherein the customer data management system is a customer relationship management ("CRM") system.

19. A system for synchronizing data between a customer data management system and a data warehouse, wherein the data warehouse comprises a data warehouse server and a data storage device and stores data from the customer data management system, the method comprising:

a data synchronization controller for:
    creating a first list for a first item and a second item in the customer data management system that the data warehouse server automatically monitors;
    creating a second list for a third item and a fourth item in the customer data management system that the data warehouse server does not need to monitor;
    creating a synchronization table which comprises the first list and the second list;
    reading files for the first and second items on the first list from the customer data management system;
    extracting metadata from the files for the first item and creating a corresponding object for the first item in a metadata repository, and extracting metadata from the files for the second item and creating a corresponding object for the second item in the metadata repository, wherein each corresponding object comprises a plurality of columns, and comprises information about ID and data type of the first and second items, wherein the corresponding object for the first item in the metadata repository and the first item have a different number of columns, and wherein the metadata from the files for the first item and the corresponding object for the first item comprise a first type of data in the first item, and the metadata from the files for the second item and the corresponding object for the second item comprise a second type of data in the second item, and wherein the first type of data and second type of data are different;
    converting the data types in the customer data management system to corresponding data types in the data warehouse system with a data type conversion logic; and
    excluding the third and fourth items.

* * * * *